(12) United States Patent
Sangapu et al.

(10) Patent No.: US 7,757,057 B2
(45) Date of Patent: Jul. 13, 2010

(54) OPTIMIZED ROLLBACK OF COPY-ON-WRITE SNAPSHOT VOLUMES

(75) Inventors: Satish Sangapu, Wichita, KS (US); Joseph G. Moore, Wichita, KS (US); William A. Hetrick, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 706 days.

(21) Appl. No.: 11/604,513

(22) Filed: Nov. 27, 2006

(65) Prior Publication Data

US 2008/0126699 A1    May 29, 2008

(51) Int. Cl.
  *G06F 12/16* (2006.01)
(52) U.S. Cl. ............................ 711/162; 711/161
(58) Field of Classification Search ............... None
  See application file for complete search history.

(56) References Cited

U.S. PATENT DOCUMENTS

| | | | |
|---|---|---|---|
| 2004/0181558 A1* | 9/2004 | Williams et al. | 707/200 |
| 2004/0236916 A1* | 11/2004 | Berkowitz et al. | 711/162 |
| 2005/0027956 A1* | 2/2005 | Tormasov et al. | 711/162 |
| 2006/0015696 A1* | 1/2006 | Nguyen et al. | 711/162 |
| 2007/0174569 A1* | 7/2007 | Schnapp et al. | 711/162 |
| 2007/0300033 A1* | 12/2007 | Kano | 711/170 |

* cited by examiner

*Primary Examiner*—Than Nguyen
(74) *Attorney, Agent, or Firm*—Suiter Swantz pc llo

(57) ABSTRACT

The present invention is an optimized method for the rollback of copy-on-write snapshot volumes. A method in accordance with the present invention may comprise the following steps: (a) creating a copy-on-write snapshot volume; (b) receiving a base volume write request addressed to a base volume data block; (c) executing copy-on-write operations; (d) receiving a snapshot volume rollback request; (e) disabling the copy-on-write operations; and (f) executing volume copy operations.

22 Claims, 7 Drawing Sheets

OPTIMIZED ROLLBACK OF COPY-ON-WRITE SNAPSHOT VOLUMES

FIELD OF THE INVENTION

The present invention relates to the field of logically partitioned mass storage systems and, more particularly, optimizing the rollback of a copy-on-write snapshot volume to a base volume.

BACKGROUND OF THE INVENTION

Many of today's operating systems manage the allocation of space on mass storage devices by partitioning this space into volumes. The term volume refers to a logical grouping of physical storage space elements which are spread across multiple disks and associated disk drives, as in a redundant array of inexpensive disks (RAID). Volumes are part of an abstraction which permits a logical view of storage as opposed to a physical view of storage. As such, most operating systems see volumes as if they were independent disk drives. Volumes are created and maintained by Volume Management Software. A volume group is a collection of distinct volumes that comprise a common set of drives.

A RAID controller may include a volume copy feature that is capable of replicating the entire contents of one volume to another volume. To use a volume copy feature, a user may specify an existing volume or create a new volume for use as a target volume for the volume copy operation. The volume to be copied is referred to as the source volume. The target volume generally requires a capacity at least as large as that of an existing source volume. Following the submission of a volume copy request to a RAID controller, the volume copy operation reads blocks of data from the source volume and writes the data to the target volume while managing the consumed controller hardware bandwidth to control the performance impact of the copy operation. During the copy operation, the source volume is not readable and the target volume is not readable or writable.

Snapshot technology has become a prevalent mechanism for ensuring data protection or supporting other tasks such as data mining and data cloning in today's mass storage systems, such as a RAID. "Snapshot" is a common industry term denoting the ability to of a RAID system to record the state of a base volume at a specified moment in time for the purpose of restoring the base volume to that state at a point in the future. The original copy of the data located on the base volume continues to be available to applications without interruption, while the snapshot copy is used to perform other functions on the data. Snapshots provide an excellent means of data protection as well as providing better application availability, faster recovery, easier back up management of large volumes of data, and reduced exposure to data loss.

One implementation of a snapshot volume system is the copy-on-write snapshot. In this implementation, a snapshot volume includes snapshot image repository sub-volumes. When the snapshot volume is first created, a snapshot image comprising only meta-data of the original base volume data is written to the snapshot image volume. No physical copy of the base volume data is made at the time of snapshot creation. Therefore, the creation of the snapshot is almost instantaneous. This meta-data image may comprise reference markers or pointers to data stored in the base volume.

The snapshot volume then tracks the changes to blocks of the original base volume as writes to the base volume are performed. Before a write to an original data block of the base volume is allowed, a copy-on-write protocol copies that original data block to the repository volume associated with a given snapshot image. This keeps the snapshot data consistent with the exact time the snapshot was taken. A given base volume data block is copied into the snapshot volume only upon receipt of the first write request for that data block following creation of the snapshot volume.

Following creation of a snapshot volume, certain applications, such as data protection, data analysis and reporting, and data replication applications may access the point-in-time data preserved by the snapshot. Read requests to the snapshot volume referencing base volume data blocks which are unchanged since the creation of the snapshot are redirected to the original base volume data. Read requests to the snapshot volume referencing base volume data blocks which have been copied from the base volume to the repository volume (via a copy-on-write) are directed to these copied blocks in the repository volume.

A common operation in such systems is the restoration of the base volume to the point-in-time state preserved by a snapshot. This restoration process is commonly known as rollback. Currently, snapshot rollback may be implemented as a firmware application associated with the snapshot management feature of a RAID controller.

Current RAID controllers maintain distinct snapshot rollback and volume copy firmware occupying valuable device resources. However, the ultimate result of a snapshot rollback and a volume copy of a snapshot volume is the same. Each results in the complete replication of a source volume (e.g. the snapshot volume) to a target volume (e.g. the base volume). Therefore, it would be desirable to provide a general purpose volume copy feature which could be used by a copy-on-write snapshot volume controller for snapshot rollback operations.

However, current implementations of volume copy features write the entire extent of a source volume to a target volume. As such, using the volume copy feature to copy the entire extent of a snapshot volume back to the base volume (i.e. a rollback) would entail writing all data previously copied to the snapshot volume via copy-on-write operations and all unaltered original base volume data. This writing of the entire extent of the snapshot to the base volume would, in turn, initiate copy-on-write operations of that entire extent to any currently associated snapshot volumes. As snapshot volumes are configured with storage capacities significantly smaller than their associated base volume, the copy-on-write of an entire snapshot volume would result in snapshot volume overflows and corresponding data loss.

Current implementations of volume copy as a snapshot rollback mechanism employ a two-step process. In this process, the entire extent of a snapshot volume is copied to an intermediate volume and the snapshot volume is then deleted. The intermediate volume is then copied to the original base volume. While this scheme is effective at preventing copy-on-write overflow with respect to the subject snapshot volume (which can be deleted following its replication to the intermediate volume), it is not uncommon to have multiple snapshot volumes associated with a given base volume. These additional snapshot volumes would also be susceptible to copy-on-write overflow due to the volume copy operation writing the entire extent of a given snapshot volume to their associated base volume. Additionally, the use of the intermediate volume scheme entails multiple configuration requests by the controller, user interaction to create the temporary volume, multiple volume copy requests by the controller and the reduced performance associated with each of these issues.

Therefore, it would be desirable to provide a snapshot volume rollback method using a general purpose volume copy operation which writes directly to an associated base volume without inducing copy-on-write overflow in snapshot volumes associated with the base volume.

SUMMARY OF THE INVENTION

Accordingly, the present invention is directed to an optimized method of rolling back a copy-on-write snapshot volume using a general-purpose volume copy function.

In an embodiment of the invention, a method for optimized rollback of a copy-on-write snapshot volume is disclosed. The method may include the following steps: (a) creating a copy-on-write snapshot volume; (b) receiving a base volume write request addressed to a base volume data block; (c) executing copy-on-write operations; (d) receiving a snapshot volume rollback request; (e) disabling the copy-on-write operations; and (f) executing volume copy operations.

In a further embodiment of the invention a computer-readable medium having computer readable instructions stored thereon for execution by a processor to perform a method is disclosed. The method may include the following steps: (a) creating a copy-on-write snapshot volume; (b) receiving a base volume write request addressed to a base volume data block; (c) executing copy-on-write operations; (d) receiving a snapshot volume rollback request; (e) disabling the copy-on-write operations; and (f) executing volume copy operations.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
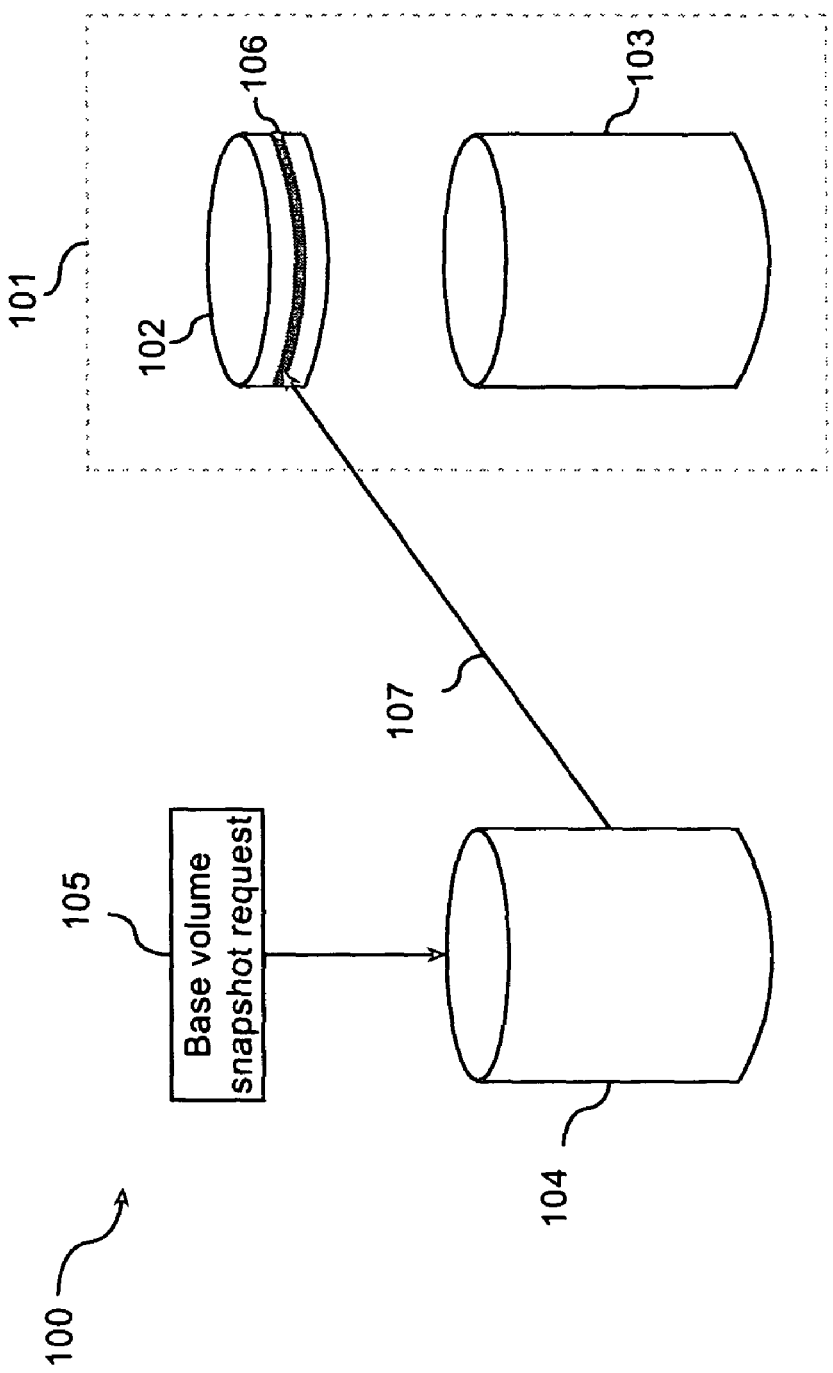
FIG. 1 is an illustrative representation of the creation of a snapshot volume in accordance with an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Reference will now be made in detail to the presently preferred embodiments of the invention.

Referring to FIGS. 1-6 generally, a mass storage system 100, 200, 300, 400, 500 and 600 which may be partitioned into logical volumes in accordance with an embodiment of the present invention is depicted.

Referring to FIG. 1, an illustrative representation of the creation of a snapshot volume 101 in accordance with an embodiment of the present invention is depicted. The snapshot volume 101 creates a point-in-time image of a base volume 104 while allowing full read/write access to the base data volume. A snapshot request 105 of a base volume 104 may be generated by an external host (not pictured) having access to the base volume. In such an arrangement, an external user may dictate specific points in time at which they desire to preserve a given state of the base volume. Additionally, a snapshot request 105 for a base volume 104 may be initiated by a command internal to a mass storage device, such as by a RAID controller. In such an arrangement, the device itself may automatically create snapshots so as to preserve periodic backup images of the base volume 104 to enable system recovery following a failure.

The snapshot volume 101 is comprised of two sub-volumes: a snapshot image volume 102 and a repository volume 103. When a snapshot volume 101 is first created, its repository volume 103 is empty and the base volume 104 is used for any snapshot volume data access, such as for archiving purposes. A snapshot image 106 comprising the meta-data referencing original base volume data is also written 107 to the snapshot image volume at the time of snapshot creation. This snapshot image 106 may comprise reference markers or pointers to the location of data stored in the base volume 104. No physical copy of the base volume data is made at the time the snapshot is created. Therefore, the creation of the snapshot is almost instantaneous.

Figure 2:
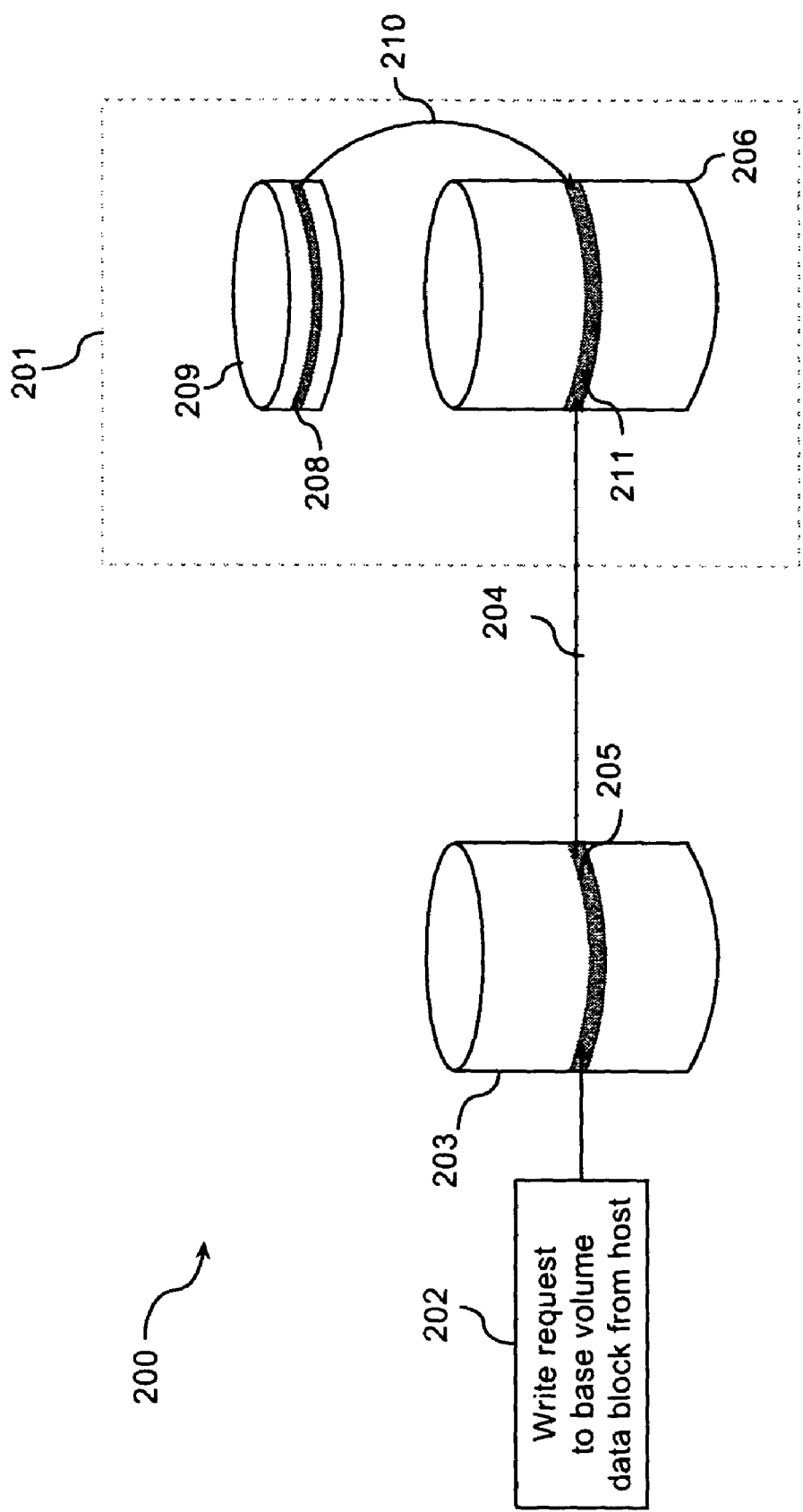
FIG. 2 is an illustrative representation of a copy-on-write operation in accordance with an embodiment of the present invention.

Referring to FIG. 2, an illustrative representation of a copy-on-write operation in accordance with an embodiment of the present invention is depicted. Following creation of a snapshot volume 201, a write request 202 to a base volume data block 203 will initiate a copy-on-write operation. During a copy-on-write operation, the base volume data blocks 205 addressed by the write request 202 will be copied 204 to the repository volume 206 of the snapshot volume 201 prior to the over-writing of the base volume data 205 addressed by the write request 202. The write request may be initiated by an external host or by an internal I/O operation. However, an internal write request due to a volume copy operation will not trigger a copy-on-write, as will be discussed below.

After the copy operation 204 is complete, the meta-data 208 located on the snapshot image volume 209 which maps to the base volume data addressed by the write request is remapped 210 to the copied base volume data 211 located in the repository volume 206.

Figure 3:
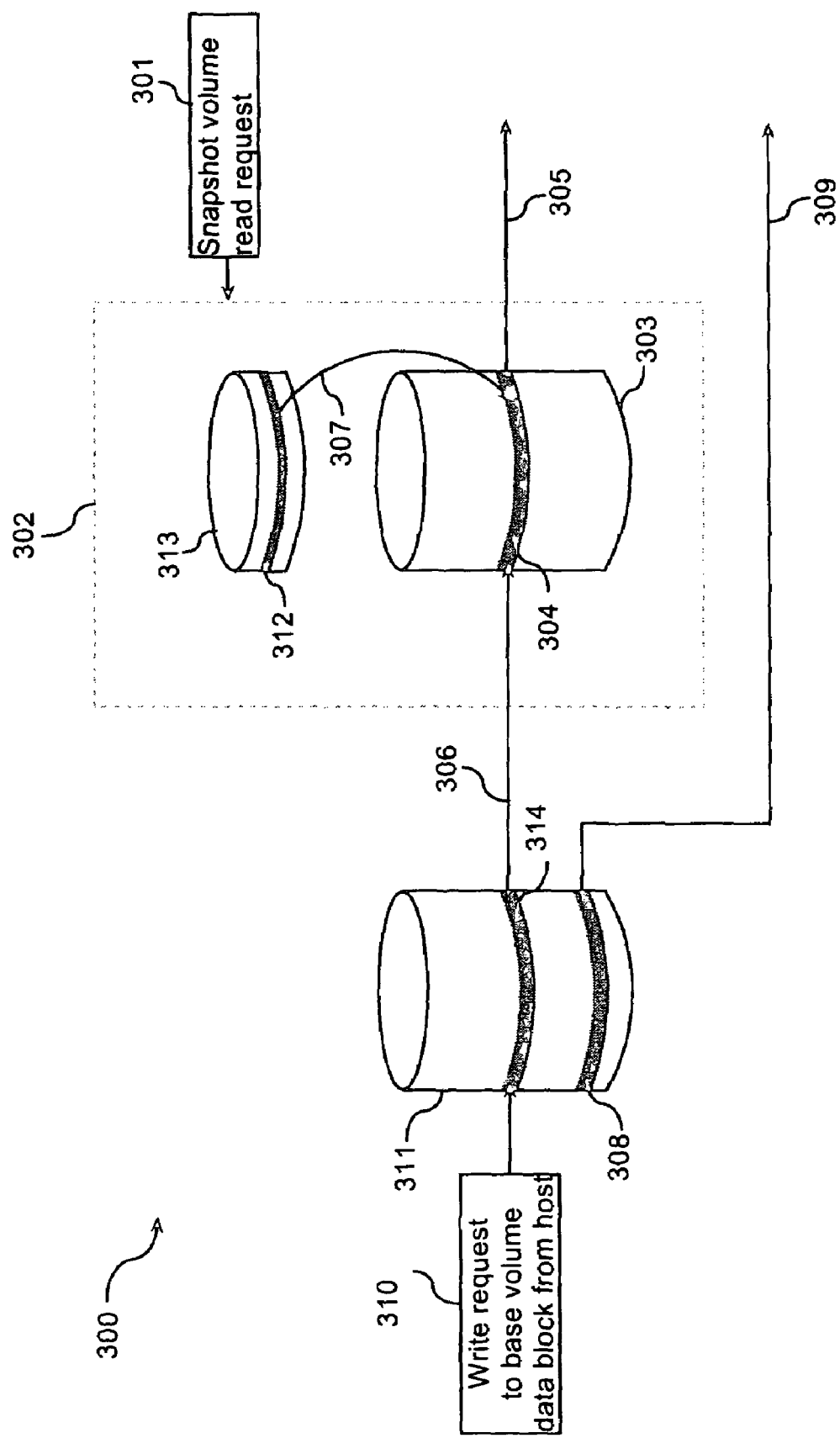
FIG. 3 is an illustrative representation of a read operation for a snapshot volume in accordance with an embodiment of the present invention.

Referring to FIG. 3, an illustrative representation of a read operation for a snapshot volume in accordance with an embodiment of the present invention is depicted. When an external host or an internal RAID operation submits a read request 301 to the snapshot volume 302, the read operations first look in the repository volume 303 for the requested data. If a previous write-request 310 to a data block 314 of the base volume 311 has resulted in a copy-on-write operation 306 from the base volume 311 to the repository volume 303 and a corresponding remapping 307 of the meta-data 312 of the snapshot image volume 313 with respect to base volume data block 314, the requested data will be present in the repository volume 303. This repository volume data block 304 is used to respond 305 to the read request 301. If the requested data is not in the repository volume (i.e. there has been no copy-on-write operation 306 or snapshot image remapping 307 with respect to the data requested by the read request 301) base volume data 308 will be used to respond 309 to the read request.

Figure 4:
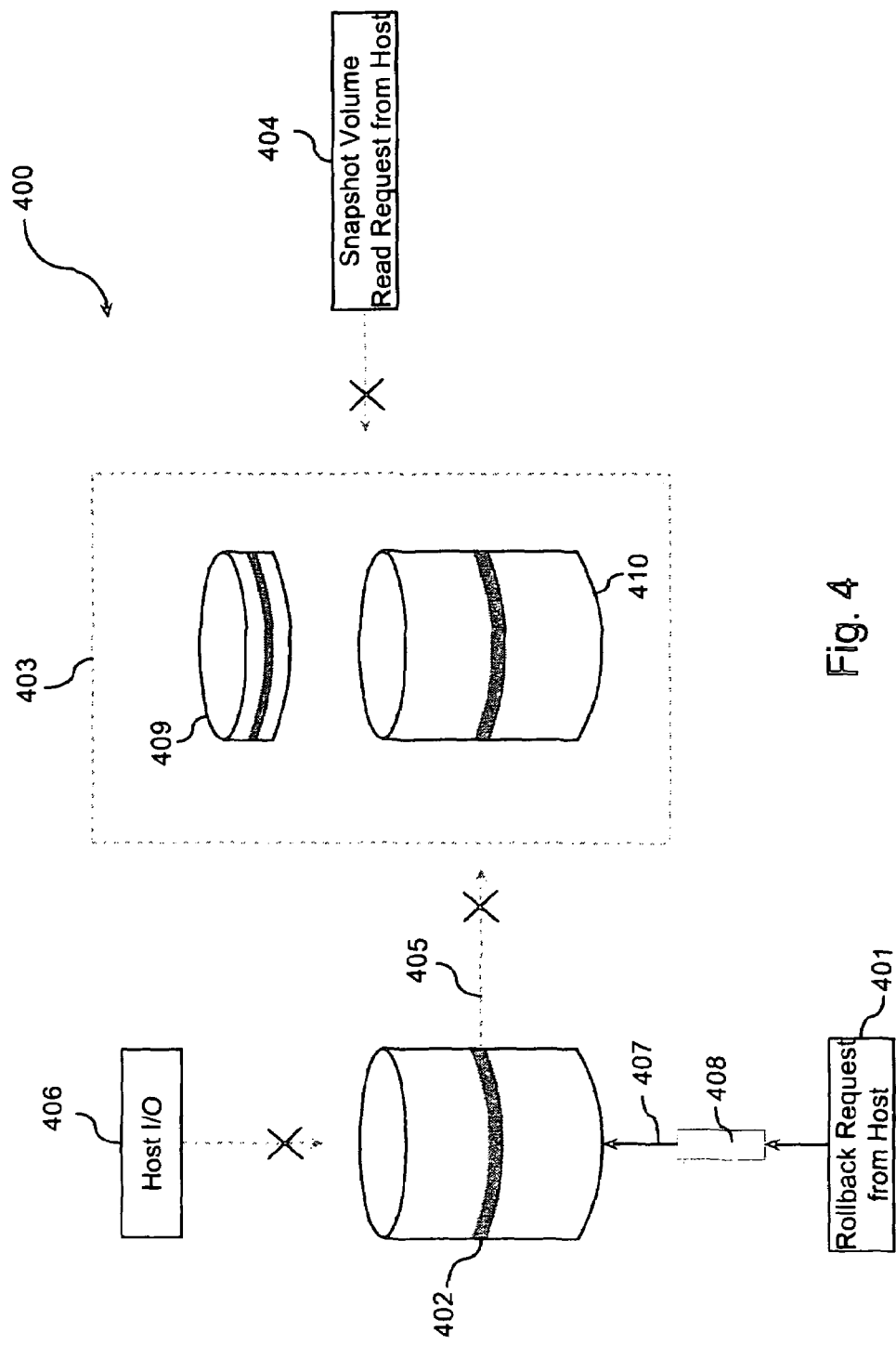
FIG. 4 is an illustrative representation of the issuance of a rollback operation in accordance with an embodiment of the present invention.

Referring to FIG. 4, an illustrative representation of the issuance of a snapshot rollback request in accordance with an embodiment of the present invention is depicted. When an external host issues a request 401 to roll back the base volume 402 to the state preserved by the snapshot volume 403, the snapshot volume 403 becomes off-line for all read requests 404. Additionally, all copy-on-write operations 405 from the base volume 402 are disabled for all associated snapshot volumes including those snapshot volumes which may not subject to the rollback operation. Also, the rollback request 401 may be translated into a general purpose volume copy request 407 by a RAID controller 408 with the snapshot volume 403 as the source and the base volume 402 as the target. An active volume copy request may disable host I/O 406 access to the base volume 402.

It may not be acceptable to change the snapshot copy-on-write state and then set up a volume copy request as a write request could arrive (from a host or an internal RAID operation) that would be missed by the snapshot copy-on-write, therefore resulting in an inexact restored image of the snapshot. Therefore, the disablement of the copy-on-write operations 405 and the issuance of a volume copy request 409 may occur as an atomic configuration change.

Disabling the copy-on-write operations 405 improves the system performance by permitting use of general purpose volume copy operations over the entire extent of the snapshot volume 403 (i.e. the repository volume 409 and the snapshot image volume 410). This is due to the fact that the disabled state of the copy-on-write operations 405 circumvents the need to copy the snapshot volume 403 data to an intermediate volume before applying the data to the base volume 402. With the disabled configuration, neither the volume copy nor the snapshot controller entities are aware of that the requested volume copy operation is, in fact, a snapshot volume rollback operation. Internal I/O requests to the base volume generated by the volume copy operations pass directly through to the base volume without performing a copy-on-write operation 405 to the repository volume 410. Host I/O requests 406 to the base volume return as failed. Read requests to the snapshot volume 404 return as failed.

Figure 5:
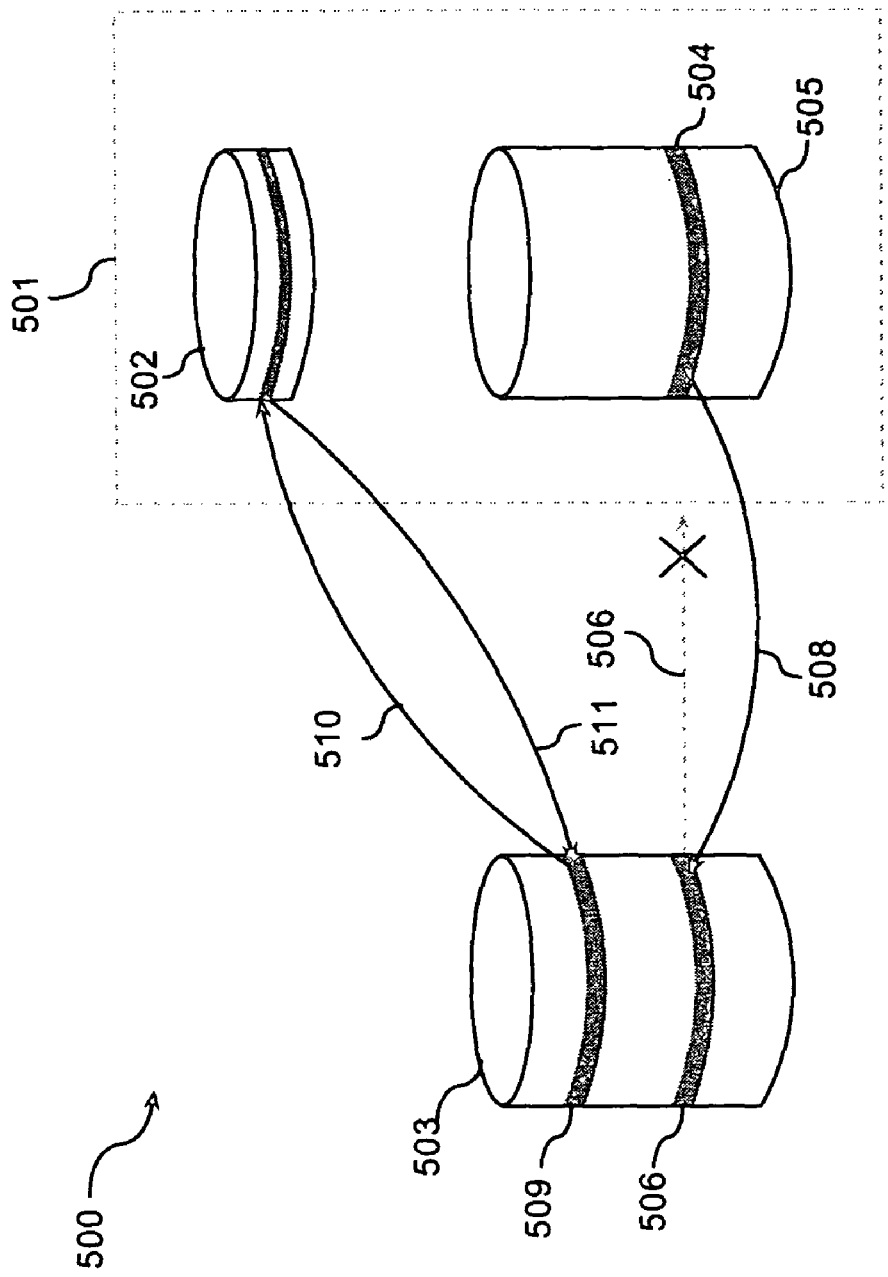
FIG. 5 is an illustrative representation of a rollback operation in accordance with an embodiment of the present invention.

Referring to FIG. 5, an illustrative representation of a rollback/volume copy operation in accordance with an embodiment of the invention is depicted. In this embodiment of the invention, the entire extent of the snapshot volume 501 (including the snapshot image volume 502 and the repository volume 503) is written to the base volume 503. During the rollback/volume copy operation, data blocks 504 located in the repository volume 505 which were previously copied from the base volume 503 via a copy-on-write operation 506 are copied back to the base volume 503 replacing the altered data 507. Base volume data 509 which is still mapped 510 to meta-data maintained in the snapshot image volume 502 may also copied back 511 to the base volume so as to account for a volume copy of the entire extent of the snapshot volume 501.

Figure 6:
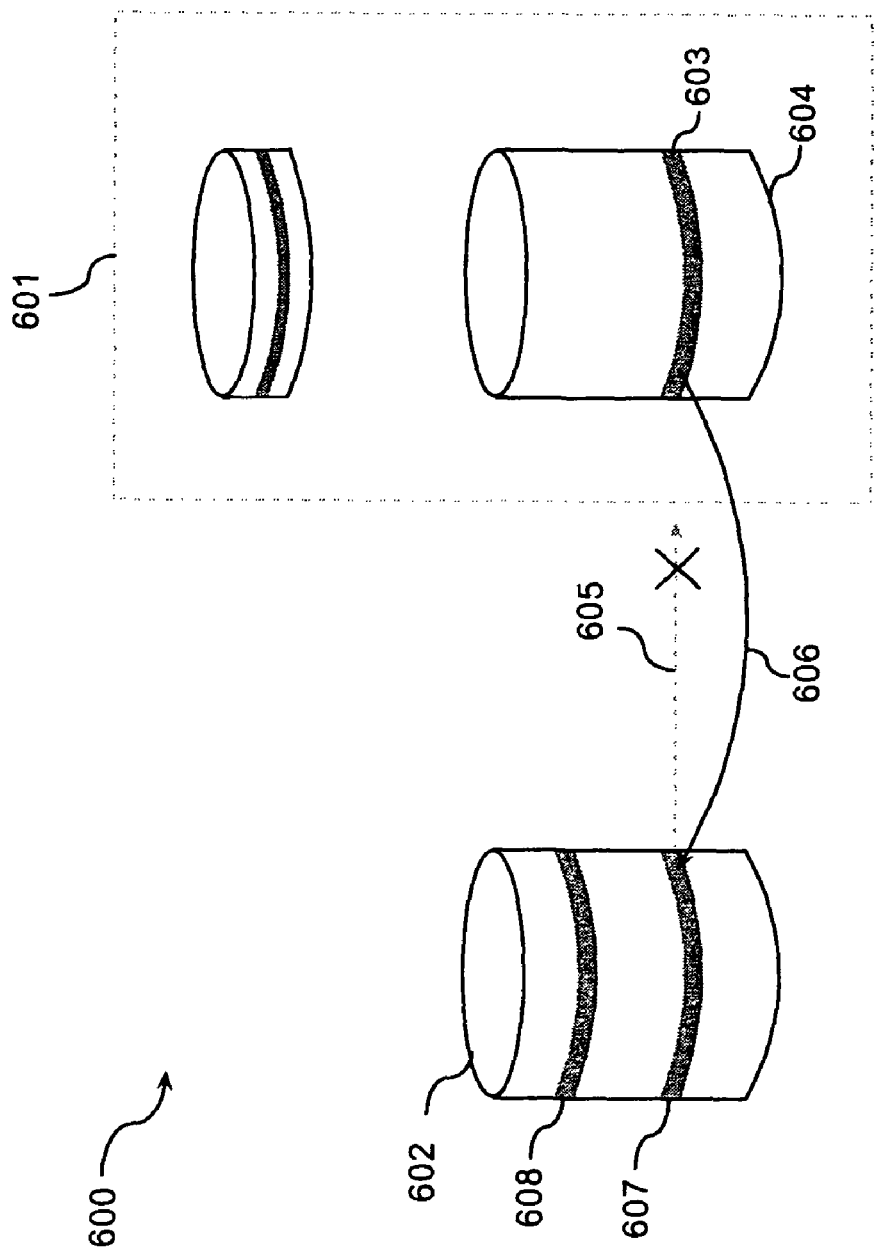
FIG. 6 is an illustrative representation of a rollback operation in accordance with an embodiment of the present invention.

Referring to FIG. 6, an illustrative representation of a rollback operation in accordance with an embodiment of the present invention is depicted. In this embodiment of the invention, less than the entire extent of the snapshot volume 601 is written to the base volume 602. During the rollback/volume copy operation, data blocks 603 located in the repository volume 604 which were previously copied from the base volume 602 via a copy-on-write operation 605 are copied back 606 to the base volume 602 replacing the altered data 607. However, volume copy read requests to the snapshot volume 601 return a short-circuit "good" status with no data movement if a requested extent is not present in the repository volume 603 (i.e. no copy-on-write operation has occurred with respect to the data blocks addressed by the read request and the snapshot image volume meta-data still maps the data blocks addressed by the read request to the base volume). With this operational behavior of the snapshot volume 601, the volume copy operation behaves normally by reading blocks of a source (i.e. the snapshot volume 601) and writing to a target (i.e. the base volume 602) over the "entire extent" of the source volume. However, in unaltered base volume data blocks 608 where the states of the base volume and the snapshot volume are consistent, the volume copy operation is cut short, resulting in no data movement, thus further optimizing the overall rollback process.

Figure 7:
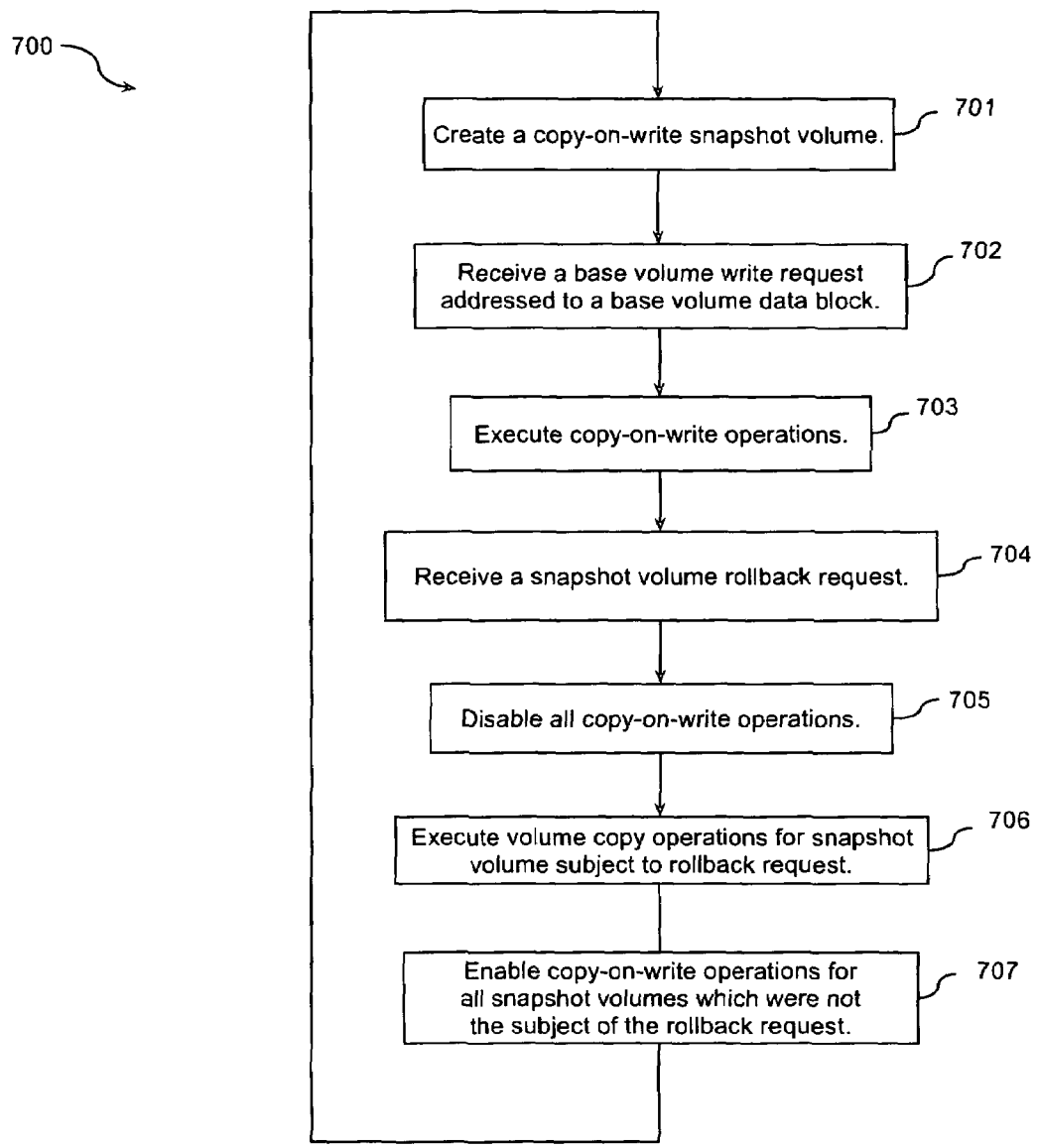
FIG. 7 is a process flowchart for a method of snapshot volume rollback in accordance with an embodiment of the present invention.

Referring to FIG. 7, a process flowchart for a method of snapshot volume rollback in accordance with the present invention is depicted. A copy-on-write snapshot volume for a base volume is created at state 701. The snapshot volume may comprise snapshot image and repository sub-volumes. When a snapshot volume is first created, its repository volume is empty and the base volume is used for any snapshot volume data access, such as for archiving purposes. A snapshot image comprising the meta-data referencing the original base volume data blocks is written to the snapshot image volume at the time of snapshot creation. This snapshot image may comprise reference markers or pointers to the location of data stored in the base volume. No physical copy of the base volume data is made at the time the snapshot is created. Therefore, the creation of the snapshot is almost instantaneous.

A base volume write request is received at state 702. A write request received by the RAID controller from an external entity serves to update base volume data blocks. Such a request may initiate a copy-on-write operation.

Copy-on-write operations are executed at state 703. During a copy-on-write operation, base volume data blocks addressed by a write request will be copied to a repository sub-volume of a snapshot volume prior to the over-writing of the base volume data blocks addressed by the write request. The write request may be initiated by an external host or by an internal I/O operation. However, an internal write request due to a volume copy operation will not trigger a copy-on-write, as will be discussed below. After a copy operation is complete, the meta-data located on a snapshot image volume which mapped to the base volume data is remapped to the copied base volume data located in the repository volume.

A snapshot volume rollback request is received at state 704. When an external host issues a request to roll back a base volume to a state preserved by a snapshot volume, the snapshot volume becomes off-line for all read requests. The rollback request may then be translated into a general purpose volume copy request by a RAID controller with the snapshot volume as the source and the base volume as the target.

All copy-on-write operations from the base volume are disabled for all associated snapshot volumes (including those snapshot volumes which may not subject to the rollback operation) at state 705. Disabling the copy-on-write operations improves the system performance by permitting use of general-purpose volume copy operations over the entire extent of the snapshot volume as the disabled state of the copy-on-write operations circumvents the need to copy snapshot volume data to an intermediate volume before applying the data to the base volume. With the disabled configuration, neither the volume copy operation nor the snapshot firmware entities are aware of that the requested volume copy operation is, in fact, a snapshot volume rollback operation.

The snapshot volume is rolled back via the volume copy feature at state 706. An active volume copy request may place I/O restrictions on host access. Specifically, a volume copy source volume may be readable but not writeable. Likewise, a volume copy target may not be readable or writeable. Internal write requests to the base volume generated by the volume copy operations pass directly through to the base volume without performing a copy-on-write operation to the repository volume. Host I/O requests to the base volume return as failed. Host read requests to the snapshot volume return as failed.

It may not be acceptable to change the snapshot copy-on-write state and then set up a volume copy request as a write request could arrive (from a host or an internal firmware service) that would be missed by the snapshot copy-on-write operations and result in an inexact restored image of the snapshot. Therefore, the disablement of the copy-on-write operations and the issuance of a volume copy request may occur as an atomic configuration change.

In an embodiment of the invention, the entire extent of a snapshot volume including the snapshot image volume and the repository volume is written to a base volume at state 706. During the rollback/volume copy operation, data located in the repository volume which was previously copied from the base volume via a copy-on-write operation is copied back to the base volume replacing the modified data. Base volume data which is still mapped to meta-data maintained in the snapshot image volume may also copied back to the base volume so as to account for the volume copy of the entire extent of the snapshot volume.

In a further embodiment of the invention, less than the entire extent of the snapshot volume is written to the base volume at state 706. During the rollback/volume copy operation, data located in the repository volume which was previously copied from the base volume via a copy-on-write operation is copied back to the base volume replacing the altered data. However, volume copy read requests to the snapshot volume return a short-circuit "good" status with no data movement if the requested extent is not present in the repository volume (i.e. no copy-on-write operation has occurred with respect to the data blocks addressed by the volume copy read request and the snapshot image volume meta-data still maps the data blocks addressed by the volume copy read request to the base volume). With this operational behavior of the snapshot volume, the volume copy operation behaves normally by reading blocks of the source (i.e. the snapshot volume) and writing to the target (i.e. the base volume) over the "entire extent" of the source volume. However, in regions where the base volume and the snapshot agree, the volume copy operation is cut short, resulting in no data movement, thus further optimizing overall process.

Copy-on-write operations for snapshot volumes which were not subject to a given rollback operation are enabled at state 707. In order to prevent snapshot volume overflow during the rollback of a particular snapshot of a base volume, all snapshots of that base volume are disabled at state 705. However, multiple system states may have been preserved in multiple snapshots with respect to the base volume. It may be desirable to maintain the remainder of the states after the rollback of a particular snapshot. As such, copy-on-write operations are enabled for the remaining snapshots following the completion of the rollback for the particular snapshot.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for snapshot volume rollback, the method comprising the steps:
   creating a copy-on-write snapshot volume;
   receiving a base volume write request addressed to a base volume data block;
   executing copy-on-write operations;
   receiving a snapshot volume rollback request;
   disabling the copy-on-write operations; and
   executing volume copy operations.

2. The method of claim 1, wherein the creating a copy-on-write snapshot volume comprises:
   creating a snapshot image volume comprising meta-data referencing base volume data blocks; and
   creating a repository volume comprising copy-on-write data.

3. The method of claim 1, wherein the base volume write request is received from an external host.

4. The method of claim 1, wherein the base volume write request is received from a RAID controller.

5. The method of claim 1, wherein the step of executing copy-on-write operations further comprises the steps:
   copying a base volume data block addressed by the base volume write request to a repository volume; and
   dereferencing meta-data of a snapshot image volume which references the base volume data block addressed by the base volume write request.

6. The method of claim 1, wherein the receipt of the snapshot rollback request disables the copy-on-write operations.

7. The method of claim 1, wherein the step of executing volume copy operations further comprises the step:
   copying base volume data blocks previously copied to a repository volume via a copy-on-write operation to the base volume.

8. The method of claim 7, wherein the step of executing volume copy operations further comprises the step:
   copying base volume data blocks referenced by snapshot image volume meta-data to the base volume.

9. The method of claim 1, wherein the snapshot volume rollback request is made by an external host.

10. The method of claim 1, wherein the snapshot volume rollback request is made by an internal RAID controller.

11. The method of claim 1, wherein a source volume for the volume copy operations is a snapshot volume and a target volume for the volume copy operations is a base volume.

12. A computer-readable medium having computer readable instructions stored thereon for execution by a processor to perform a method the method comprising the steps:
creating a copy-on-write snapshot volume; receiving a base volume write request addressed to a base volume data block;
executing copy-on-write operations;
receiving a snapshot volume rollback request;
disabling the copy-on-write operations; and
executing volume copy operations.

13. The computer-readable medium of claim 12, wherein the copy-on-write snapshot volume comprises:
creating a snapshot image volume comprising meta-data referencing base volume data blocks; and
creating a repository volume.

14. The computer-readable medium of claim 12, wherein the base volume write request is received from an external host.

15. The computer-readable medium of claim 12, wherein the base volume write request is received from a RAID controller.

16. The computer-readable medium of claim 12, wherein the step of executing copy-on-write operations further comprises the steps:
copying a base volume data block addressed by the base volume write request to a repository volume; and
dereferencing meta-data of a snapshot image volume which references the base volume data block addressed by the base volume write request.

17. The computer-readable medium of claim 12, wherein the receipt of the snapshot rollback request disables the copy-on-write operations.

18. The computer-readable medium of claim 12, wherein the step of executing volume copy operations further comprises the step:
copying base volume data blocks copied to a repository volume to the base volume.

19. The computer-readable medium of claim 18, wherein the step of executing volume copy operations further comprises the step:
copying base volume data blocks referenced by the snapshot image volume meta-data to the base volume.

20. The computer-readable medium of claim 12, wherein the snapshot volume rollback request is made by an external host.

21. The computer-readable medium of claim 12, wherein the snapshot volume rollback request is made by a RAID controller.

22. The computer-readable medium of claim 12, wherein a volume copy source is a snapshot volume and a volume copy target is a base volume.

* * * * *